UNITED STATES PATENT OFFICE.

FREDERICK SODDY, OF GLASGOW, SCOTLAND.

PROCESS OF MAKING CRYSTALS CONTAINING MESOTHORIUM.

1,031,593.  Specification of Letters Patent.  Patented July 2, 1912.

No Drawing.  Application filed October 4, 1911. Serial No. 652,719.

*To all whom it may concern:*

Be it known that I, FREDERICK SODDY, a subject of His Majesty the King of Great Britain, and a resident of Glasgow, Scotland, have invented a certain new and useful Improvement in Processes of Making Crystals Containing Mesothorium, of which the following is a specification.

The object of the present invention is firstly, the separation of mesothorium from monazite sand as a crude product in the course of the manufacture of thorium compounds therefrom, and secondly, the preparation in concentrated form of the mesothorium contained in this or other crude products containing it.

By "mesothorium" is meant the constituent of thorium minerals discovered by Hahn (*Berichte der Deutschen Chemischen Gesellschaft*. 1907, 40, p 1462,) which, together with the products it produces spontaneously in the course of time, causes the greater part of the radioactivity of these minerals in the same sense as radium is the constituent which, with its products, causes the greater part of the radioactivity of minerals containing uranium.

Commercial thorium compounds are free from mesothorium when first prepared, but in the course of time mesothorium is produced in them. For this reason the ash from old incandescent gas mantles contains mesothorium, which may be separated during the process for the recovery of the contained thorium by the invention herein described.

The invention is based upon the discovery I have made that mesothorium and barium are extremely closely related in their entire chemical nature. Mesothorium resembles radium in this respect and can be separated by the use of barium from all other substances.

It is common knowledge that one particular compound of barium, namely barium sulfate, is used as an adsorbent for many substances, partially withdrawing some from a mixture of substances in solution and leaving others in the solution, and that this action has been used in the separation of mixtures of radioactive substances from one another. This adsorption process in general effects only a partial separation and is variable in its action as it depends upon a variety of conditions which cannot be exactly controlled, such as the size of the particles of the precipitated barium sulfate, the temperature, viscosity and constituents of the solution, the presence or absence of traces of substances capable of preventing the action and the degree of agitation of the liquid during precipitation. Boltwood (*American Journal of Science*, 1907, (IV), 24, p. 93) has shown that mesothorium may be separated from manufactured thorium compounds by precipitating barium sulfate in the solution. He attributed this separation of an adsorption action of the barium sulfate.

The present invention relates to a practical process for the separation of mesothorium and its preparation in concentrated form from a mixture, even as complex and as poor in mesothorium as monazite sand, and consists in utilizing the discovery I have made that the action of barium in the separation of mesothorium is not a physical or adsorption action confined to the one compound barium sulfate, but is due to an almost complete chemical similarity between mesothorium and barium. If the separation of mesothorium with barium sulfate were due to an adsorption as soon as the barium sulfate were converted into some other compound of barium it could not be foretold in any chemical operation with the said compound whether the mesothorium would remain with the barium or not. Whereas the knowledge of the fact that mesothorium and barium are chemically closely related enables an expert chemist, even though ignorant of the special means of detection, identification, and quantitative estimation of radioactive substances, to separate mesothorium from a mixture by adding thereto barium if not already present and separating out the barium from all other substances.

The principle of the subsequent separation of the mesothorium from the barium is based upon the additional discovery I have made that in so far as mesothorium differs from barium it resembles radium and can so be concentrated by the fractional crystallization of the purified barium chlorid containing mesothorium. This chemical resemblance, which so far as I know is perfect, between mesothorium and radium could not possibly have been inferred or deduced from existing knowledge, but its disclosure herein puts any chemist able to separate radium from the radium residues of uranium minerals in a position to separate mesothorium from thorium minerals. When monazite sand is treated in the ordinary way in the manufacture of thorium therefrom the mesothorium therein, on account of its practically infinitesimal quantity, and because of the absence therein of barium in practically separable quantity, behaves chemically indefinitely, being partially removed at each successive stage of the manufacture. But if a sufficient quantity of any barium compound to be practically completely separable is added, to the monazite sand, the chemical behavior of the mesothorium therein becomes at once definite and predictable.

In the first part of the process herein described, the mesothorium is separated in the first stage of the treatment of monazite sand for the manufacture of thorium compounds, without detriment to this manufacture. The first stage in the manufacture of thorium compounds is to heat monazite sand with excess of sulfuric acid, and to stir the cooled product with cold water, whereby the monazite is dissolved. A muddy liquor is so obtained which may be without difficulty poured off from the heavy residue of unattacked sand. This muddy liquor when left to stand deposits a small sediment. In the process, herein described, a small quantity say one thousandth part by weight of say barium carbonate is added, either to the monazite sand, or to the mixture of monazite sand and acid before heating. When the monazite sand is treated as described, this added barium is deposited as barium sulfate with the sediment from the muddy liquor before referred to. This sediment then contains the mesothorium present in the mineral and will be referred to subsequently as the crude mesothorium product. Another way of performing the same operation, which is applicable when the monazite sand is ground before treatment, is to add to the clear solution of monazite in sulfuric acid and water, obtained as described, a solution containing a small quantity of a barium compound, with efficient stirring, and in this case also the mesothorium is precipitated with the barium sulfate.

The quantity of barium salts necessary to be added to effect a good separation is regulated chiefly by the volume of the liquids treated and by the solubility of barium sulfate therein. The quantity must not be so small that any practically important fraction of the barium remains in solution, but may be made as large as is necessary to give a precipitate of convenient amount. One hundredth part of the weight of monazite sand or raw material is a safe proportion of barium salt but this amount may be reduced usually as experience of the process is gained. When the addition is made to the solution as described, the solution of the barium salts must be dilute and must be added slowly with efficient continuous agitation of the whole bulk of the solution to which it is added, to avoid a merely local formation of the precipitate.

The process may be employed without essential modification to the recovery of mesothorium from incandescent mantle ash, for the first stage in the recovery of thorium therefrom is identical to that employed for monazite sand.

In the second part of the process, herein described, namely, the concentration of the mesothorium in the crude products derived from minerals containing thorium, either in the manner described or in other ways, the material is treated chemically by the usual processes having for their object the separation of the continued barium with the mesothorium from all other substances. Should the crude products not contain sufficient barium a small quantity is added at the commencement of or during the concentration process. The exact method followed will depend upon the nature of the crude material, the nature and amount of the impurities present and the equipment and character of the factory in which the work is done, but the object of the process is always to separate the whole of the contained barium chlorid together with the mesothorium from all the substances present which are different from barium in chemical properties.

As an example the crude mesothorium material obtained from monazite sand or from gas mantle ash will be considered. The first step is to dissolve it. Solution of the sulfates may be effected by conversion into carbonates, either by fusion with sodium carbonate, or by long boiling with concentrated solution of sodium carbonate. The product is washed free from sulfates and dissolved in hydrochloric acid. The product will be referred to as the crude chlorids.

If preferred solution may be effected by heating with carbon, and treatment of the sulfids formed with hydrochloric acid whereby the long washing to free the carbonates from sulfates in the carbonate process is avoided. The crude barium chlorid is then further purified. A convenient method is to saturate the solution of the crude chlorids with hydrochloric acid gas, whereby the barium chlorid is precipitated. The barium chrorid contains the mesothorium.

The concentration of the mesothorium from the barium chlorid with which it is mixed may be effected by fractional crystallization of the purified barium chlorid, in the same manner as in the known process for the concentration of radium from barium chlorid. When barium chlorid containing mesothorium is crystallized the mesothorium is concentrated in the crystals, and the mother liquor is partially deprived of mesothorium. By systematic repetition of the process, the mother liquor of the richer preparations being used to dissolve new quantities of the poorer preparations, there is obtained on the one hand mesothorium preparations of any desired degree of concentration and on the other barium chlorid of any desired degree of impoverishment. The latter preparations need not be entirely freed from mesothorium but may be used with advantage instead of fresh barium in the working up of fresh thorium mineral.

What I claim is:—

Process of making crystals containing mesothorium, consisting in treating monazite sand or other material containing mesothorium with any compound of barium and precipitating the barium as barium sulfate which carries with it the mesothorium, reconverting the barium and mesothorium into soluble form and separating them from the other constituents and fractionally crystallizing said barium and mesothorium, the latter being concentrated in the crystals first deposited.

In testimony whereof I have hereunto set my hand in the presence of two subscribing witnesses.

FREDERICK SODDY.

Witnesses:
ALEXANDER FLEEK,
A. H. BODLE.